United States Patent
Schramm et al.

(10) Patent No.: US 6,349,247 B1
(45) Date of Patent: Feb. 19, 2002

(54) METHOD AND DEVICE FOR STABILIZING A MOTOR VEHICLE IN ORDER TO PREVENT IT FROM ROLLING OVER

(75) Inventors: Herbert Schramm, Leonberg; Klaus-Dieter Leimbach, Moeglingen; Falk Hecker, Markgroeningen; Oliver Jundt, Besigheim-Ottmarsheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/600,683

(22) PCT Filed: Nov. 24, 1998

(86) PCT No.: PCT/DE98/03457
§ 371 Date: Oct. 13, 2000
§ 102(e) Date: Oct. 13, 2000

(87) PCT Pub. No.: WO99/37516
PCT Pub. Date: Jul. 29, 1999

(30) Foreign Application Priority Data

Jan. 21, 1998 (DE) .......................... 198 02 041

(51) Int. Cl.$^7$ ................................. G06F 7/00
(52) U.S. Cl. ................ 701/1; 701/38; 701/72; 340/429
(58) Field of Search .................. 701/1, 38, 72, 701/74, 82, 45; 280/271; 340/429

(56) References Cited

U.S. PATENT DOCUMENTS

| | | | | |
|---|---|---|---|---|
| 4,927,173 A | * | 5/1990 | Clifton, Jr. et al. | 280/755 |
| 5,032,821 A | * | 7/1991 | Domanico et al. | 340/440 |
| 5,446,658 A | | 8/1995 | Pastor et al. | 364/424.01 |
| 5,471,386 A | | 11/1995 | Hrovat et al. | 364/426.02 |
| 6,002,974 A | * | 12/1999 | Schiffmann | 701/36 |
| 6,081,761 A | * | 6/2000 | Harada et al. | 701/72 |

FOREIGN PATENT DOCUMENTS

| | | |
|---|---|---|
| DE | 32 22 149 | 11/1983 |
| DE | 42 28 893 | 3/1994 |
| DE | 44 16 991 | 11/1995 |
| DE | 195 29 539 | 2/1997 |
| DE | 196 02 879 | 8/1997 |
| EP | 0 321 894 | 6/1989 |
| EP | 0 330 149 | 8/1989 |

* cited by examiner

Primary Examiner—Yonel Beaulieu
(74) Attorney, Agent, or Firm—Kenyon & Kenyon (57) ABSTRACT

A method for stabilizing a vehicle in particular to prevent overturning, in which a strategy is selected from at least two different strategies as a function of a quantity describing or corresponding to whether an overturn tendency about a vehicle axis oriented in the longitudinal direction of the vehicle exists, and which may be determined at least as a function of a quantity describing or corresponding to the wheel behavior of at least one wheel, and which may also be determined a function of a comparison which is carried out as a function of a quantity describing or corresponding to the lateral dynamics of the vehicle and of a characteristic value that is determined as a function of a quantity describing or corresponding to the instantaneous friction conditions.

20 Claims, 4 Drawing Sheets

METHOD AND DEVICE FOR STABILIZING A MOTOR VEHICLE IN ORDER TO PREVENT IT FROM ROLLING OVER

This Application is a 371 of PCT/DE98/03457.

FIELD OF THE INVENTION

The present invention relates to a method and a device for stabilizing a vehicle to prevent overturning.

BACKGROUND INFORMATION

German Patent No. 32 22 149 concerns a device for preventing the lateral overturning of a vehicle. This vehicle is a van-carrier (gantry-lift). The device contains a device for calculating the static stability of the vehicle, as a critical reference value, from the quotient of the vehicle tread width and the double height of the overall center of gravity. Moreover, the device contains a device for calculating the dynamic instability from the quotient of the squared vehicular speed and the product of the cornering radius calculated from the specific steering angle and the gravitational acceleration. When the dynamic instability exceeds the reference value, then the vehicular speed is reduced. This is carried out, first of all, by activating the vehicle brakes and, secondly, by activating the engine clutch correspondingly.

German Published Patent Application No. 44 16 991 concerns a method and a device for alerting the driver of a truck about overturn danger during cornering. To this end, prior to the vehicle entering a curve, the vehicle type and the condition data which is relevant for the overturn danger are ascertained, and the overturn risk, or the limit speed decisive for the latter, is determined as a function of the vehicle's center of gravity and of the cornering radius. A signal prompting for speed reduction is triggered when the prevailing driving speed of the vehicle constitutes an overturn danger or when a predefined safety distance from the overturn danger is undershot. The driving speed of the vehicle at which definitely no overturn risk exists is determined on the basis of an overturn equation. Entering into the overturn equation are, inter alia, the vehicular speed, the cornering radius driven through by the vehicle, the height of the center of gravity of the vehicle above the roadway, as well as the unbalance of the wheel loads. The wheel loads are ascertained by wheel load sensors embedded in the roadway. If the driving speed of the vehicle falls below a predefined safety distance from the driving speed which is at the verge of the overturn danger, then a signal is generated which alerts the drive of the vehicle about excessive speed while driving through the curve. The signal indicating the excessive driving speed is triggered until the specific measured driving speed is reduced to a degree which rules out any risk of overturning.

SUMMARY OF THE INVENTION

An object of an exemplary method of the present invention and of an exemplary embodiment of the present invention involves providing that a quantity describing or corresponding to the wheel behavior of at least one wheel is considered in the determination of a quantity which describes whether an overturn tendency exists for the vehicle, in particular an overturn tendency about a vehicle axis oriented in the longitudinal direction of the vehicle. For this reason, it is possible to respond faster to an overturn tendency since the overturn of a vehicle becomes noticeable first in the wheel behavior.

An object of an exemplary method of the present invention and of an exemplary embodiment of the present invention involves providing that the instantaneous friction conditions are considered in the determination of the characteristic value for the quantity describing the lateral dynamics of the vehicle. Because of this, the road conditions, which influence the overturn behavior of a vehicle, are taken into account and, consequently, it is believed that accuracy is improved.

An object of an exemplary method of the present invention and of an exemplary embodiment of the present invention involves providing that they are suitable for combinations, articulated road trains, busses, as well as for passenger cars having a high center of gravity such as vans or off-road vehicles, i.e., that they can be used for different

BRIEF DESCRIPTION OF THE DRAWINGS

It should be pointed out that blocks having the same designation in different Figures have the same function.

DETAILED DESCRIPTION

First of all, FIGS. 1a and 1b will be discussed which show different road vehicles in which the exemplary embodiments of the present invention can be used.

Figure 1A:
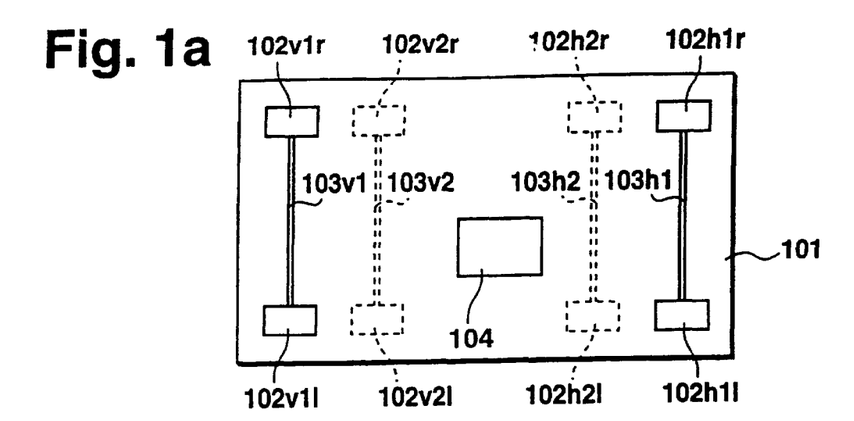
FIG. 1a shows a road vehicle in which exemplary embodiments of the present invention may be used.

FIG. 1a shows a one-part vehicle 101 which can either be a passenger car or a commercial vehicle. Vehicle 101 shown in FIG. 1a is assumed to be a vehicle having at least two wheel axles, which is indicated by the partially dotted representation. The wheel axles of vehicle 101 are designated by 103ix. In this context, index i indicates whether it is a front axle (v) or a rear axle (h). In the case of vehicles having more than two axles, index x indicates which of the front or rear axles is dealt with. In this context, the following correspondence applies: the front or rear axle which is closest to the vehicle boundary is allocated index x having the lowest value, respectively. The farther the specific wheel axle is away from the vehicle boundary, the higher is the value of appertaining index x. Allocated to wheel axles 103ix are wheels 102ixj. The meaning of indices i and x, respectively, corresponds to that mentioned above. Index j indicates whether the wheel is located on the right (r) or on the left (l) vehicle side. In the representation of wheels 102ixj, no distinction is made between single wheels and twin wheels. Furthermore, vehicle 101 contains a control unit 104 in which the device according to an exemplary embodiment of the present invention for carrying out the exemplary method according to the present invention is implemented.

Figure 1B:
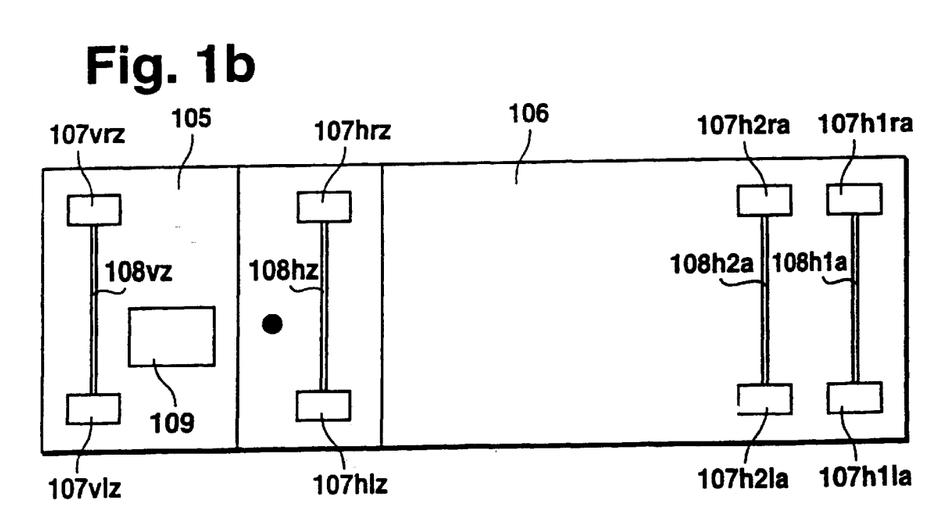
FIG. 1b shows another road vehicle in which exemplary embodiments of the present invention may be used.

FIG. 1b shows a vehicle combination composed of a tractor vehicle 105 and a semitrailer 106. The chosen representation is not intended to constitute a limitation; also conceivable is a vehicle combination which is composed of tractor vehicle and a drawbar trailer. Tractor vehicle 105 is assumed to have wheel axles 108iz. Allocated to wheel axles 108iz are corresponding wheels 107ijz. The meaning of indices i and j, respectively, corresponds to that already mentioned in connection with FIG. 1a. The wheel axles or wheels of the tractor vehicle are identified by index z. Furthermore, tractor vehicle 105 contains a control unit 109 in which the method according to the present invention is executed, and by which both tractor vehicle 105 and semitrailer 106 are stabilized. Semitrailer 106 is assumed to have two wheel axles 108ixa. Wheels 107ixja are allocated to the two wheel axles 108ixa in a corresponding manner. The meaning of indices i, x and j, respectively, corresponds to that already depicted in connection with FIG. 1a. Index a identifies the components of semitrailer 106. The number of wheel axles shown in FIG. 1b for tractor vehicle 105 and semitrailer 106, respectively, is not intended to constitute a limitation. Control 109 can likewise be mounted in semitrailer 106 instead of in tractor vehicle 105. Moreover, it is conceivable for both tractor vehicle 105 and semitrailer 106 to be equipped with a control unit.

The marking by indices a, i, j, x, and z chosen in FIGS. 1a and 1b is equivalent for all quantities or components for which it is used.

The exemplary method according to the present invention and the device according to an exemplary embodiment of the present invention, respectively, are related to the stabilization of a vehicle in particular to an overturn detection. In this application, two specific embodiments are described which each are based on a different procedure in the selection of the used stabilization strategies. The two embodiments will be discussed in connection with FIGS. 3 and 4.

First of all, the device according to an exemplary embodiment of the present invention, which both embodiments are based on, will be described by way of FIG. 2.

Figure 2:
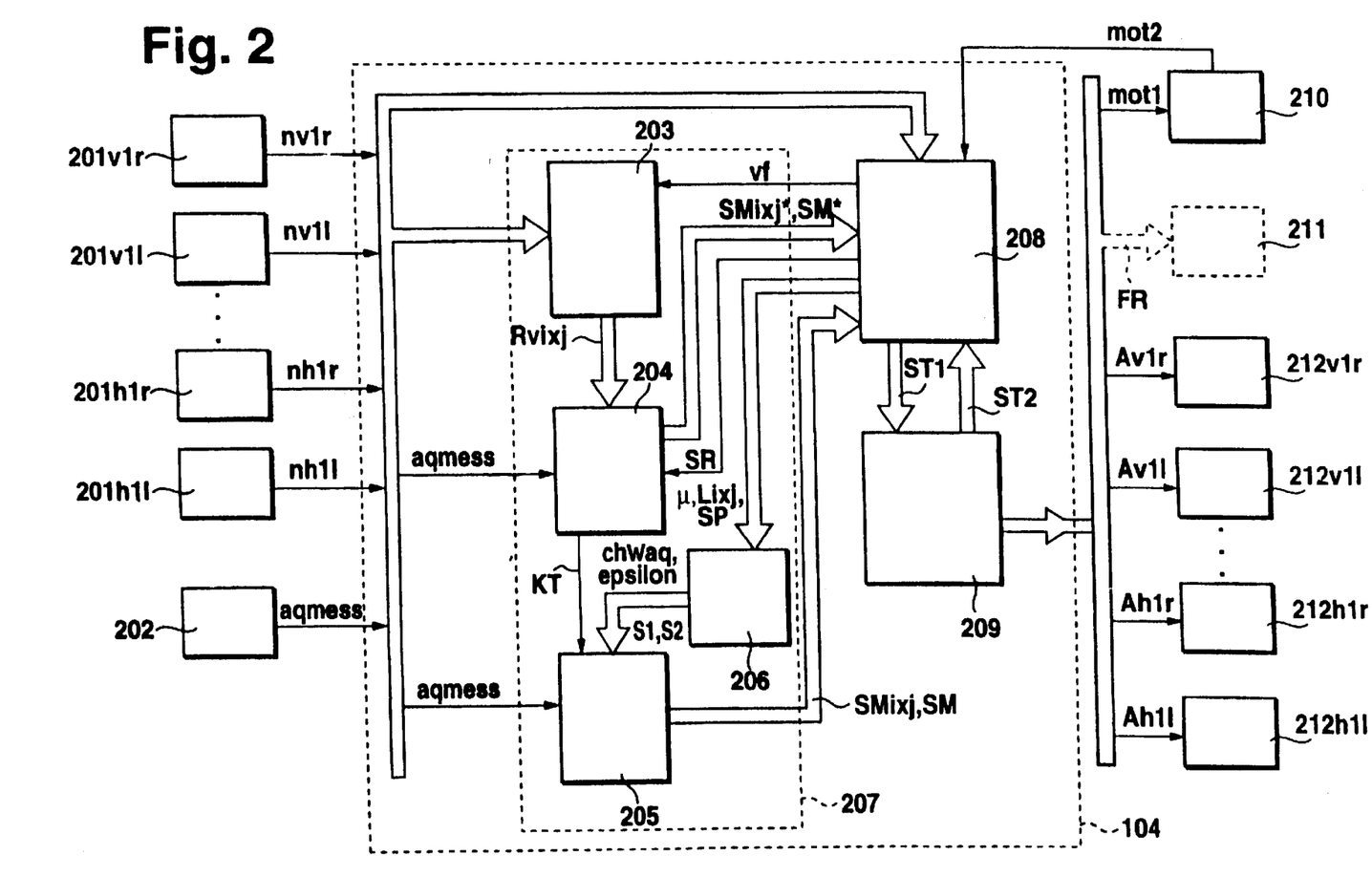
FIG. 2 shows an arrangement of the device for implementing the exemplary method of the present invention.

The vehicle shown in FIG. 2 is a one-part vehicle as is shown, for example, in FIG. 1a. This one-part vehicle is assumed to have at least two wheel axles 103ix which are assumed to be front axle 103v1 including wheels 102v1r and 102v1l as well as rear axle 103h1 including wheels 102h1r and 102h1l. Wheel-speed sensors 201v1r, 201v1l, 201h1r and 201h1l appertaining to these wheels are shown in FIG. 2. Depending on the number of wheel axles of the one-part vehicle, further wheel-speed sensors 201ixj are added as indicated in FIG. 2. Wheel-speed sensors 201ixj are used to ascertain quantities nixj which describe the wheel speed of the corresponding wheel 102ixj, respectively. Quantities nixj are fed blocks 203 and 208. Wheel-speed sensors 201ixj are provided in any case, independently of the type of controller 208.

Moreover, the vehicle contains a sensor 202 which is used to ascertain a quantity describing or corresponding to the lateral dynamics of the vehicle. In the present case, the quantity describing the lateral dynamics of the vehicle is a quantity aqmess describing the transverse acceleration of the vehicle. In lieu of a quantity describing the transverse acceleration of the vehicle, a quantity describing the yaw rate of the vehicle can be used, as well. Quantity aqmess measured by sensor 202 is fed to blocks 203, 204, 205, and 208. Instead of using a sensor, quantity aqmess can alternatively be derived from wheel speeds nisj, as well.

FIG. 2 shows a sensory mechanism which is used if controller 208 is, for example, a known brake-slip controller which, because of the closed-loop control running in it, intervenes in the wheel brakes and/or if the controller is a traction controller which, because of the closed-loop control running in it, intervenes in the wheel brakes and/or in the engine. At this point, it should be mentioned again that the transverse acceleration sensor is not necessarily required. Transverse acceleration aqmess can also be determined on the basis of wheel speeds nixj. Of course, further sensors can be added as a function of the type of controller 208 implemented in the device according to an exemplary embodiment of the present invention. If, for example, controller 208 is a controller which, in its basic function, by interventions in the wheel brakes and/or in the engine, controls a quantity describing the drive dynamics of the vehicle, preferably a quantity which depends on the transverse acceleration and/or on the yaw rate of the vehicle, then, besides wheel-speed sensors 201ixj and transverse acceleration sensor 202, a yaw-rate sensor and steering-angle sensor exist as well. Such a controller is known, for example, from the publication "FDR—die Fahrdynamikregelung von Bosch" ("ESP—the electronic stability program of Bosch") published in "Automobiltechnische Zeitschrift" (Automotive Engineering Magazine) (ATZ) 16, 1994, issue 11, on pages 674 through 689.

The structural representation chosen in FIG. 2 is not intended to constitute a limitation. Possibly, modifications may be required as a function of the type of the implemented controller, as indicated above.

In the following, vehicle 101 is assumed to have wheel-speed sensors 201ixj and a transverse acceleration sensor 202.

In a block 203, quantities Rvixj are determined which quantitatively describe the behavior of the wheels of the vehicle. To this end, wheel speeds nixj, quantity aqmess, as well as a quantity vf which describes the vehicular speed, and which is ascertained in block 208 from wheel speeds nixj in known manner, are fed to block 203. Quantities Rvixj, which quantitatively describe the wheel behavior, are fed to a block 204. In this block 204, a quantity KT is ascertained at least as a function of quantities Rvixj, quantity KT describing whether or not an overturn tendency exists for the vehicle, in particular an overturn tendency about a vehicle axis oriented in the longitudinal direction of the vehicle.

In the following, the determination of quantities Rvixj being executed in block 203 and the determination of quantity KT being executed in block 204 will be discussed as a whole since both processes are closely related. For ascertaining quantity KT, two different procedures can be utilized. In a first one, braking torques and/or drive torques are generated and/or changed for a short time; a second one makes do without this generation.

When working with the first procedure, first of all, quantity aqmess is compared to a corresponding threshold value in block 204. If quantity aqmess is greater than the threshold value, then this suggests that the vehicle is in a critical condition in terms of the lateral dynamics. In this case, therefore, quantities SMixj* or SM* are generated in block 204 and fed to block 208. On the basis of quantities Smixj*, braking torques are generated and/or changed at at least one wheel for a short time by controller 208 and appertaining control logic 209. On the basis of quantities Smixj* and SM*, drive torques are generated and/or changed at at least one wheel for a short time by controller 208 and appertaining control logic 209.

Since, in terms of the lateral dynamics, the vehicle is in a critical condition, an overturn tendency of the vehicle about a vehicle axis oriented in the longitudinal direction of the vehicle can exist. In the normal case, an overturn tendency of the vehicle may occur when that individual wheels of the vehicle lift off or threaten to lift off. Such wheels have a low road-surface adhesion which is why generating and/or changing the braking torque and/or the drive torque for a short time result in clearly recognizable changes in the wheel dynamics. At this point, it should be mentioned that it is sufficient for the above described interventions to be carried out at the wheels that, for example during cornering, are threatened by lifting off, i.e., at the inside wheels.

Furthermore, it is sufficient to generate low torques or to change the torques slightly. For the above mentioned reasons, by generating and/or changing a braking torque and/or a drive torque at the wheels, it is possible to ascertain whether or not a corresponding overturn tendency really exists for the vehicle.

When working with the first procedure, quantities Rvixj which quantitatively describe the wheel behavior of the respective wheels are ascertained in block 203 for the corresponding wheels. Used as quantities Rvixj are quantities which depend on the wheel load acting on the respective wheel. These are, for example, wheel speeds nixj themselves or a quantity describing the wheel slip or a quantity describing the wheel deceleration or the wheel acceleration. Quantities Rvixj are fed to block 204.

Alternatively to the quantities describing the wheel behavior, it is also possible in the case of the first procedure to ascertain a quantity which indicates whether a slip controller, in this case controller 208, in response to the above described generation and/or change of braking torques and/or of drive torques at at least one wheel, carries out an intervention for stabilizing this wheel. If, originating from controller 208, such an intervention is carried out and/or has been carried out, block 204 is informed of this via quantity SR. This means, comparably to quantities Rvixj, quantity SR likewise describes the behavior of at least one wheel. In this type of intervention, the controller attempts to reduce braking pressure since, in the present situation, it assumes the wheel to have an excessive wheel slip.

Consequently, the quantity describing the wheel behavior of the at least one wheel and/or the quantity indicating an intervention of the slip controller are ascertained while the braking torques and/or drive torques are generated and/or changed at the at least one wheel for a short time and/or subsequent to generating and/or changing the braking torques and/or drive torques at the at least one wheel for a short time.

During the period in which the braking torques and/or drive torques are generated and/or changed at the at least one wheel for a short time and/or subsequent to generating and/or changing the braking torques and/or drive torques at the at least one wheel for a short time, the resulting change in the quantity which quantitatively describes the wheel behavior is determined in block 204. Further, if implemented, it is determined in block 204 whether or not quantity SR indicating the intervention of the slip controller exists. As a function of quantities Rvixj and SR, respectively, an overturn tendency exists for the vehicle when the magnitude of the resulting change in quantity Rvixj which quantitatively describes the wheel behavior is greater than a corresponding threshold value and/or when quantity SR indicating the intervention of the slip controller exists. In this case, block 204 generates a quantity KT which is fed to block 205. Consequently, quantity KT, which according to its nature is an overturn quantity because it describes whether an overturn tendency exists for the vehicle, is determined at least as a function of a quantity describing the wheel behavior of at least one wheel.

When working with the second procedure, it is not required for braking torques and/or drive torques to be generated and/or changed for a short time. Determined in block 203 as the quantity which quantitatively describes the wheel behavior is a quantity which describes the diameter or the radius of the specific wheel. In particular, this quantity is the dynamic rolling radius. This quantity is determined as a function of wheel speed nixj of the corresponding wheel, quantity vf describing the vehicular speed, quantity aqmess, and of a quantity describing the geometry of the vehicle, in particular the half tread width. Quantity Rvixj is fed to block 204 in the second procedure, as well. An overturn tendency exists, for example, when quantity Rvixj is greater than a corresponding threshold value. In this case, as in the first procedure, a quantity KT is output by block 204. In the second procedure, quantity KT is determined in block 204 preferably in a manner corresponding to the first procedure if quantity aqmess is greater than a corresponding threshold value.

At this point, it should be mentioned that the representation is intended to be understood generally so that both procedures depicted above can be implemented. This is supposed to mean that either a procedure alone or a combination of both procedures can be implemented. Depending on the implementation, slight modifications can be necessary with regard to the representation in FIG. 2, which, however, is not intended to constitute a limitation.

In controller 208, different quantities are ascertained from wheel speeds nixj in known manner. First of all, a quantity $\mu$ describing the instantaneous friction conditions, i.e., those present in the specific driving situation, is determined in controller 208, for example, using wheel speeds nixj. This quantity $\mu$ is fed to a block 206. Determined in controller 208 in known manner using wheel speeds nixj are moreover quantities Lixj which describe wheel loads, and which are likewise fed to block 206. Additionally determined in controller 208 in known manner using estimation methods is a quantity SP which describes the height of the center of gravity of the vehicle, and which is likewise fed to block 206.

In block 206, different quantities are determined which are needed in block 205. First of all, a characteristic value chWaq for the quantity describing the lateral dynamics of the vehicle is ascertained in block 206. Entering into the determination of this characteristic value chWaq are wheel loads Lixj or the mass distribution of the vehicle, height of the center of gravity SP, as well as quantity $\mu$. Consequently, characteristic value chWaq is determined as a function of the load of the vehicle, as a function of the height of the center of gravity, and as a function of quantity $\mu$. Alternatively, however, it is also conceivable for characteristic value chWaq to be a definitely preset fixed value.

Figure 3:
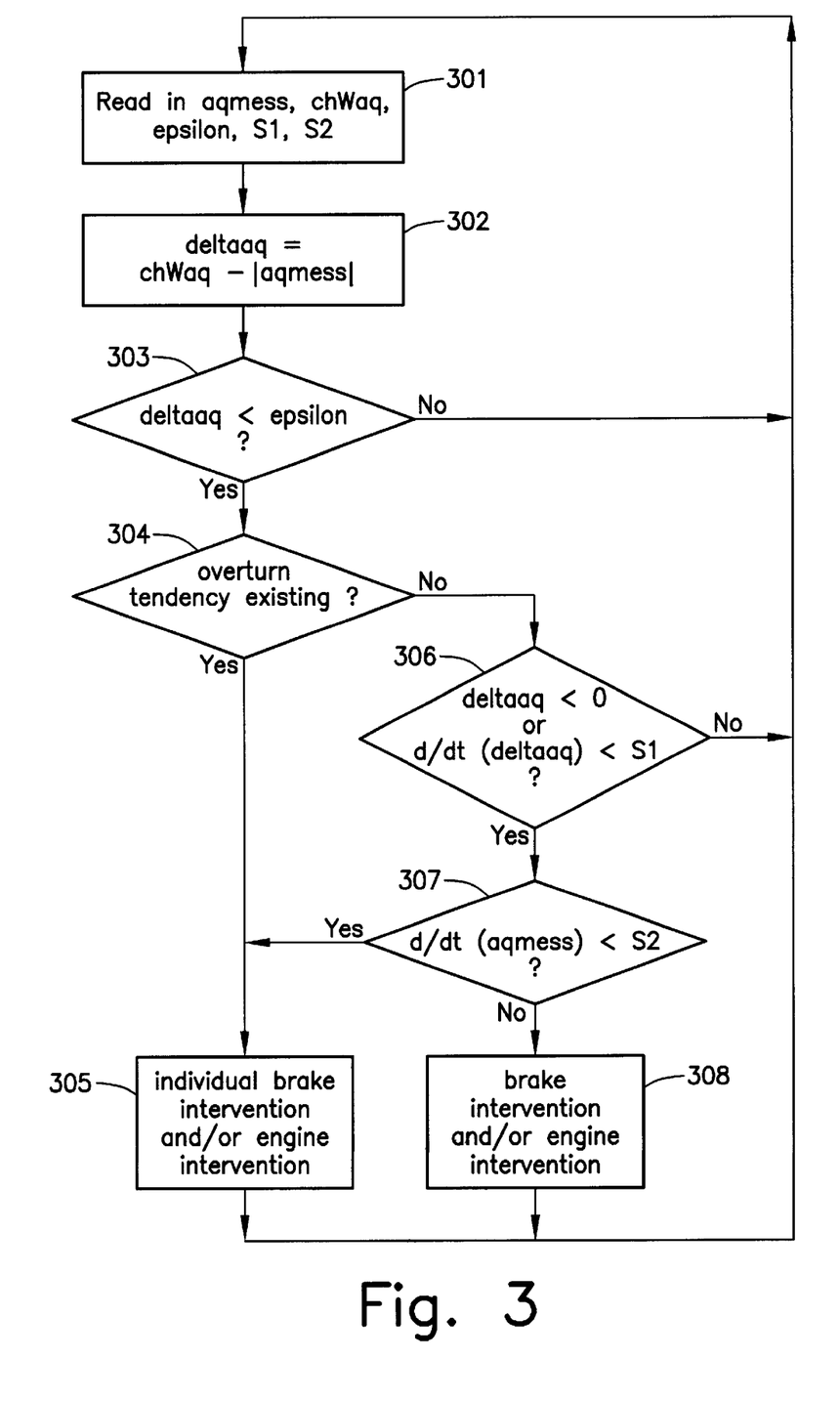
FIG. 3 shows a logic flow chart of an exemplary method of the present invention.
Figure 4:
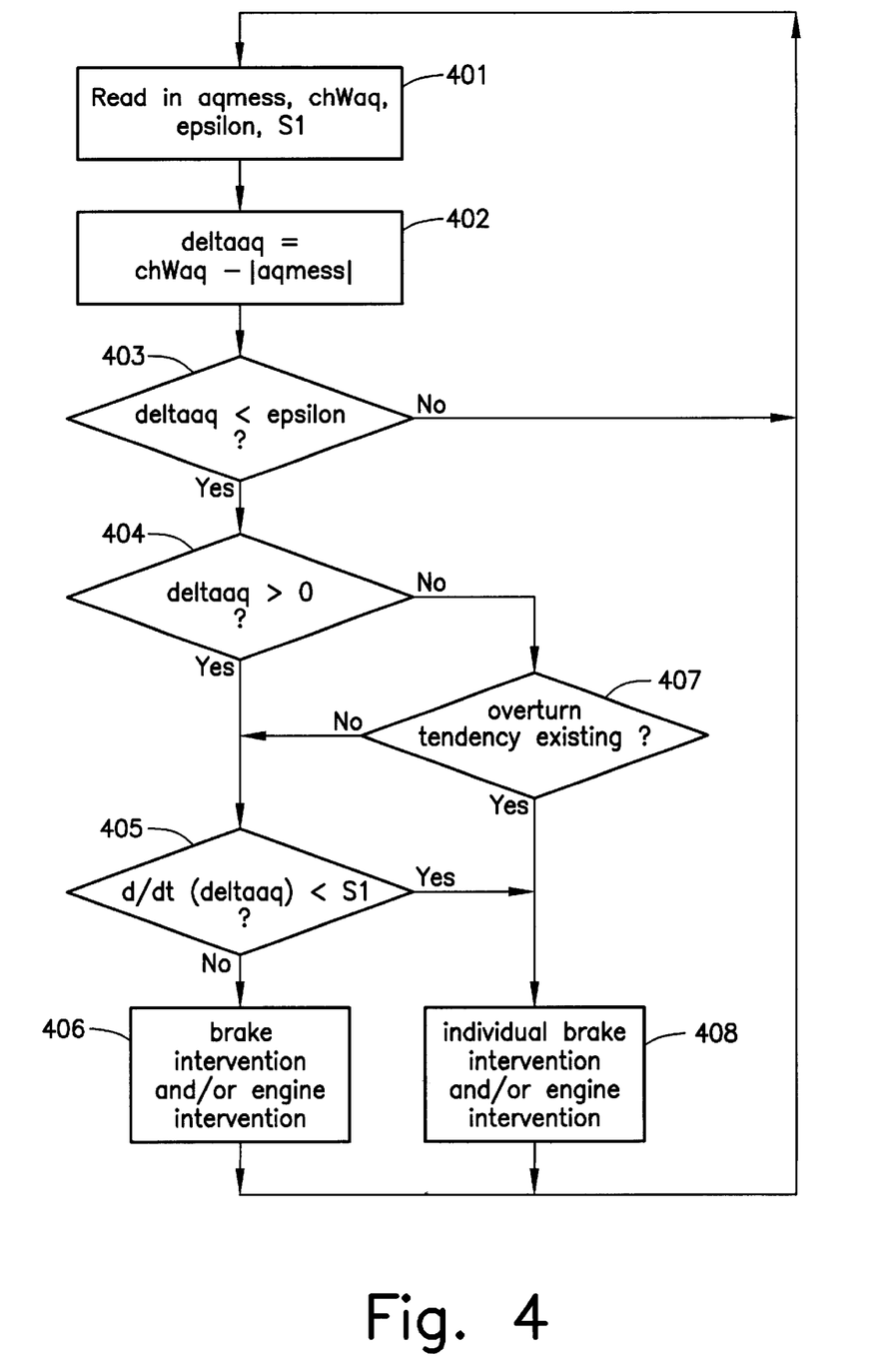
FIG. 4 shows another logic flow chart of another exemplary method of the present invention.

Quantities epsilon, S1 and S2, which represent threshold values as revealed by FIGS. 3 and 4, are still to be described, are either definitely preset fixed values, or they are determined as a function of quantity chWaq. A determination as a function of vehicular speed vf or of transverse acceleration aqmess is conceivable, as well. Originating from block 206, quantities chWaq, epsilon, S1 and S2 are fed to block 205.

In block 205, a strategy for stabilizing the vehicle is selected from at least two different strategies on the basis of the received quantities. The procedure during the selection of the strategy will be discussed in detail in connection with FIGS. 3 and 4, respectively. According to the selected strategy, block 205 generates quantities SMixj and SM which are fed to block 208. With the assistance of these quantities, it is communicated to controller 208, according to the selected strategy, which wheels must be influenced in which manner or how the engine must be influenced so that the vehicle remains stable or so that the vehicle is stabilized. It would also be conceivable for an existing strategy to be modified or changed in lieu of selecting a strategy from at least two strategies.

In FIG. 2, blocks 203, 204, 205, and 206, which are used in the exemplary embodiments of the present invention, are combined into a block 207.

The controller or vehicle controller implemented in control unit 104 is designated by 208. Controller 208 is, for example, a brake-slip controller and/or a traction controller. Alternatively, it can be a controller which, in its basic function, by interventions in the wheel brakes and/or in the engine, controls a quantity describing the drive dynamics of the vehicle, for example, a quantity which depends on the transverse acceleration and/or on the yaw rate of the vehicle. At this point, reference should be made to the publication "FDR—die Fahrdynamikregelung von Bosch" mentioned above. The control being carried out in its basic function in block 208 is based in known manner on the quantities nixj or aqmess fed to block 208, a quantity mot2 which describes, for example, the engine speed of engine 210, and which, originating from engine 210, is fed to block 208, as well as quantities ST2 which, originating from a block 209 representing the control logic for the actuators contained in the vehicle, are fed to block 208. The yaw rate possibly required for control taking place in basic form can be ascertained from quantity aqmess, and considering vehicular speed vf.

In addition to the control implemented in the basic function in block 208, an overturn prevention is implemented in the block. Within the scope of the overturn prevention, the controller basically fulfills two tasks. First of all, according to the first procedure described above, it converts quantities SMixj* or SM* into corresponding signals ST1 which are fed to control logic 209, and on the basis of which braking torques and/or drive torques are generated and/or changed at the wheels for a short time. Secondly, it converts quantities SMixj or SM into corresponding signals ST1 which are likewise fed to control logic 209, and on the basis of which corresponding brake interventions and/or engine interventions are carried out for stabilizing the vehicle. These interventions for stabilizing the vehicle can virtually be superior to the interventions of the control of the basic function.

Controller 208 generates quantities ST1 which are fed to control logic 209 used to drive the actuators allocated to the vehicle. Quantities ST1 are used to communicate to control logic 209 which actuators are to be driven in which way. With regard to the generation of quantities ST1 according to the control implemented for the basic function, reference is made to the publication "FDR—die Fahrdynamikregelung von Bosch" mentioned above. For the inventions which are carried out for detecting the overturn tendency or which are carried out for preventing overturning, quantities ST1 are modified accordingly.

For stabilizing a vehicle in response to an existing overturn tendency about a vehicle axis oriented in the longitudinal direction of the vehicle or for preventing the vehicle from overturning about a vehicle axis oriented in the longitudinal direction of the vehicle, for example, the following interventions in the actuators of the vehicle are conceivable: first of all, it is possible for the vehicular speed to be reduced by braking or by reducing the engine torque. Secondly, it is possible to counteract the overturning of the vehicle selectively by wheel-individual brake interventions. By a heavy brake intervention at selected wheels, the whole vehicle is braked. In the normal case, the selected wheels are outside wheels since in a driving situation which is critical in terms of the lateral dynamics, these have a larger wheel load and, consequently, a large braking force can be generated at these wheels. Such a brake intervention has several positive effects. First of all, the speed of the vehicle is strongly reduced as a result of which the transverse acceleration acting on the vehicle and, consequently, also the centrifugal force acting on the vehicle, are reduced at the same time. Secondly, the lateral guiding force is reduced because of the braking force at the outside wheels which is why the overturning moment acting on the vehicle is reduced, as well. Besides, by braking, the (ground) contact force at the rear axle or axles is reduced to the advantage of the contact force at the front axle or axles. By this brake intervention, a corresponding yawing moment acting on the vehicle is generated which expands the cornering radius of the vehicle as a result of which the overturning moment acting on the vehicle is further reduced.

In block 209, the control logic, quantities ST1 generated by controller 208 are converted into control signals for engine 210 and into driving signals for the actuators of the vehicle. The actuators are, for example, actuators 212ixj by which a braking force can be generated at the corresponding wheels. For controlling engine 210, the control logic generates a signal mot1 which can be used, for example, to influence the throttle-valve position of the engine. For driving actuators 212ixj, which, in particular, are designed as brakes, control logic 209 generates signals Aixj which can be used to influence the braking forces generated by actuators 212ixj at the corresponding wheels. Control logic 209 generates quantities ST2 which are fed to controller 208, and which contain information on the driving of the individual actuators.

If the vehicle is provided with a retarder 211, the control logic can additionally generate a signal FR which is used to drive the retarder. Furthermore, it is conceivable for the vehicle to be equipped with chassis actuators for influencing the chassis of the vehicle.

The braking system used in FIG. 2 can be a hydraulic or a pneumatic or an electrohydraulic or an electropneumatic braking system.

In the following, a first exemplary embodiment of the method according to the present invention, which, for the most part, is executed in block 205, is described on the basis of FIG. 3. Because in FIG. 3, only a one-part vehicle is discussed, no limitation of the scope of the present invention is intended. The flow chart depicted in FIG. 3 can also be used for a vehicle combination in a corresponding manner.

The exemplary method according to the present invention starts with a step 301, in which quantities aqmess, chWaq, epsilon, S1, and S2 are read in. Subsequent to step 301, a step 302 is executed. In step 302, a difference deltaaq is determined. To this end, the magnitude of quantity aqmess is subtracted from quantity chWaq. The magnitude of quantity deltaaq represents the distance of quantity aqmess describing the lateral dynamics of the vehicle from characteristic value chWaq. Subsequent to step 302, a step 303 is executed.

In step 303, it is ascertained in an interrogation or with the aid of a comparison wether or not quantity deltaaq is smaller than a predefinable threshold value epsilon. In other words: it is determined wether or not the distance between quantity aqmess and quantity chWaq is smaller than predefinable threshold value epsilon. If quantity deltaaq is smaller than threshold value epsilon, which means at the same time that quantity aqmess describing the lateral dynamics of the vehicle has a smaller distance from characteristic value chWaq than epsilon, and that the vehicle is consequently close to a critical driving condition in terms of the lateral dynamics, then a step 304 is executed subsequent to step 303. Starting with step 304, one of the at least two strategies for stabilizing the vehicle is selected. However, if in step 303, quantity deltaaq is ascertained to be greater than threshold value epsilon, which means at the same time that quantity aqmess describing the lateral dynamics of the vehicle has a greater distance from characteristic value chWaq than epsilon, and that the vehicle is consequently far away from a critical driving condition in terms of the lateral dynamics, then step 301 is repeated subsequent to step 303 which means at the same time that no brake interventions and/or engine interventions are carried out in this driving condition. By the comparison carried out in step 303, it is consequently decided wether or not one of the at least two strategies for stabilizing the vehicle is selected.

In step 304, it is ascertained whether an overturn tendency about a vehicle axis oriented in the longitudinal direction of the vehicle exists for the vehicle. This determination is executed in blocks 203 and 204 according to the above explanations. As explained in this connection, the overturn tendency is ascertained on the basis of a quantity which describes the wheel behavior of at least one wheel.

At this point, it should be mentioned that the wording "a vehicle axis oriented in the longitudinal direction of the vehicle" is to be understood as follows: first of all, the vehicle axis about which an overturn tendency of the vehicle occurs can be the actual longitudinal axis of the vehicle. Secondly, it can be a vehicle axis which is rotated by a certain angle relative to the actual longitudinal axis of the vehicle. In this context, it is irrelevant whether or not the rotated vehicle axis passes through the center of gravity of the vehicle. The intention is for the case of a rotated vehicle axis to also permit the vehicle axis to be oriented in such a manner that it corresponds to either a diagonal axis of the vehicle or to an axis which is parallel thereto.

If in step 304, it is ascertained that an overturn tendency exists, then a step 305 is executed subsequent to step 304. By branching from step 304 to step 305, a first strategy for stabilizing the vehicle is selected. This first strategy is essentially composed of step 305.

In step 305, brake interventions are carried out at at least one wheel for stabilizing the vehicle. These (brake interventions) are principally carried out at wheels having a large wheel load. The wheels which have a large wheel load are known because of the determination of the overturn tendency. The brake interventions are carried out in such a manner that these wheels are braked heavily. Alternatively or in a supporting manner, engine interventions are carried out for stabilizing the vehicle, in particular for reducing the vehicular speed. In this context, the brake interventions and/or the engine interventions are carried out in such a manner that quantity aqmess approaches characteristic value chWaq and/or does not exceed it. In this context, the brake interventions and/or the engine interventions are generated at least as a function of quantity deltaaq. By the brake interventions carried out within the first strategy, the wheels of the vehicle are controlled individually so that, for example, just one wheel is braked. This kind of intervention, i.e. heavy wheel-individual brake interventions are necessary because an overturn tendency already exists for the vehicle, and because these wheel-individual brake interventions, first of all, reduce the vehicular speed and, secondly, generate a yawing moment which has a stabilizing effect on the vehicle.

However, if in step 304, it is ascertained that no overturn tendency exists, then a step 306 is carried out subsequent to step 304. By branching from step 304 to step 306, a second strategy is selected. Consequently, a strategy for stabilizing the vehicle is selected from at least two strategies as a function of whether an overturn tendency of the vehicle about a vehicle axis oriented in the longitudinal direction of the vehicle exists and, consequently, as a function of quantity KT which describes this.

The second strategy is essentially composed of steps 306, 307, and 308. In step 306, a first comparison is carried out as a function of quantity deltaaq. To this end, two partial interrogations are carried out in step 306. First of all, it is ascertained in a first partial interrogation whether quantity deltaaq is negative. In this manner, it is detected whether quantity aqmess is already greater than characteristic value chWaq, i.e., whether the vehicle is already in a critical driving condition in terms of the lateral dynamics. In a second partial interrogation, it is ascertained whether the time-related change of quantity deltaaq is smaller than a corresponding threshold value S1. Threshold value S1 is a negative value. By this partial interrogation it is determined how fast quantity aqmess approaches characteristic value chWaq.

If in step 306, neither the first partial interrogation nor the second partial interrogation are fulfilled which means at the same time that quantity aqmess is smaller than characteristic value chWaq, and that quantity aqmess approaches characteristic value chWaq only slowly, then step 301 is repeated subsequent to step 306 since no stabilizing interventions are necessary in this driving condition of the vehicle. However, if either the first partial interrogation or the second partial interrogation is fulfilled in steps 306, which means at the same time that either quantity aqmess is already greater than characteristic value chWaq, or that quantity aqmess approaches characteristic value chWaq fast, then a step 307 is carried out subsequent to step 306.

In step 307, a second comparison is carried out in which it is ascertained whether the time-related change of quantity aqmess is smaller than a corresponding threshold value S2.

If in step 307, the time-related change of quantity aqmess is ascertained to be smaller than threshold value S2, then step 305 is carried out subsequent to step 307, i.e., the brake interventions and/or engine interventions are carried out according to the first strategy. Threshold value S2 is a negative value. However, if in step 307, the time-related change of quantity aqmess is ascertained to be greater than threshold value S2, then a step 308 is carried out subsequent to step 307.

In step 308, the brake interventions and/or engine interventions of the second strategy are carried out. To this end, for example, all wheels of the vehicle are braked uniformly. Engine interventions are carried out additionally or alternatively. In this context, the brake interventions and/or the engine interventions are carried out in such a manner that quantity aqmess approaches characteristic value chWaq and/or does not exceed it. In this context, the brake interventions and/or engine interventions are generated at least as a function of quantity deltaaq. By the brake interventions and/or engine interventions of the second strategy, the vehicle is stabilized by reducing the vehicular speed.

Thus, it is determined as a function of the two comparisons carried out in steps 306 or 307, whether no brake interventions and/or engine interventions are carried out, whether the brake interventions and/or engine interventions of the first strategy are carried out or whether the brake interventions and/or engine interventions of the second strategy are carried out or performed.

Both subsequent to step 305 and subsequent to step 308, step 301 is repeated.

A second embodiment of the method according to the present invention, which, in part, is executed in block 205, is described on the basis of FIG. 4. In this context, the exemplary method according to the present invention depicted in FIG. 4 on the basis of the flow chart can be used both for a vehicle combination and for a single vehicle.

The exemplary method according to the present invention starts with a step 401, in which quantities aqmess, chWaq, epsilon, and S1 are read in. Subsequent to step 401, a step 402 is executed, step 402 corresponding to step 302 described earlier. Subsequent to step 402, a step 403 is executed, which corresponds to step 303 described earlier. If the interrogation carried out in step 403 is not fulfilled, then step 401 is repeated subsequent to step 403 in a manner corresponding to FIG. 3. However, if the interrogation carried out in step 403 is fulfilled, then a step 404 is executed subsequent to step 403.

In step 404, it is ascertained whether quantity deltaaq is positive. If in step 404, quantity deltaaq is ascertained to be positive, then a step 405 is executed subsequent to step 404. By branching from step 404 to step 405, a second strategy for stabilizing the vehicle is selected, the second strategy being composed of steps 405 and 406.

In step 405, a comparison is carried out in which it is ascertained whether the time-related change of quantity deltaaq is smaller than a corresponding threshold value S1. Threshold value S1 is a negative value. The meaning of this interrogation corresponds to the second partial interrogation of step 306. If in step 405, the time-related change of quantity deltaaq is ascertained to be greater than threshold value S1, then a step 406 is carried out subsequent to step 405, i.e., the brake interventions and/or engine interventions are carried out according to the second strategy. However, if in step 405, the time-related change of quantity deltaaq is ascertained to be smaller than threshold value S1, then a step 408 is carried out subsequent to step 405, i.e., the brake interventions and/or engine interventions are carried out according to the first strategy.

For stabilizing the vehicle, the brake interventions and/or engine interventions are carried out in step 406 in such a manner that quantity aqmess is smaller than or equal to characteristic value chWaq. For example, all wheels of the vehicle are braked uniformly by the brake interventions. By the engine interventions, the engine torque is reduced correspondingly. Further explanations with regard to these brake interventions and/or engine interventions can be gathered from the description of the second strategy in FIG. 3.

However, if in step 404, quantity deltaaq is ascertained to be negative, then a step 407 is carried out subsequent to step 404. By branching from step 404 to step 407, a first strategy for stabilizing the vehicle is selected, the first strategy being composed of steps 407 and 408.

Consequently, according to step 404, a strategy for stabilizing the vehicle is selected from at least two strategies as a function of whether discussed quantity deltaaq is positive or negative.

In step 407, it is ascertained whether an overturn tendency about a vehicle axis oriented in the longitudinal direction of the vehicle exists for the vehicle. This determination is executed in blocks 203 and 204 according to the above explanations. Step 407 corresponds to step 304 described earlier. If in step 407, it is ascertained that no overturn tendency exists for the vehicle, then step 405 is carried out subsequent to step 407 and, consequently, the second strategy for stabilizing the vehicle is carried out.

However, if in step 407, it is ascertained that an overturn tendency exists for the vehicle, then a step 408 is carried out subsequent to step 407, in which the brake interventions and/or engine interventions of the first strategy are carried out for stabilizing the vehicle. The explanations regarding the first strategy of FIG. 3 apply to these brake interventions and/or engine interventions.

Both subsequent to step 406 and subsequent to step 408, step 401 is repeated.

Finally, it should be mentioned that the form of the exemplary embodiments described in the description as well as the representations chosen in the Figures are not intended to represent (have) a limiting effect on the the scope of the present inventions.

What is claimed is:

1. A method for stabilizing a vehicle, the stabilizing including preventing the vehicle from overturning about a vehicle axis oriented in a longitudinal direction of the vehicle, the method comprising the steps of:
    (a) performing at least one of the steps of:
        (i) determining if an overturn tendency exists for the vehicle; and
        (ii) making a comparison as a function of a quantity corresponding to lateral dynamics of the vehicle and of a characteristic value for the quantity corresponding to the lateral dynamics of the vehicle; and
    (b) selecting a strategy for stabilizing the vehicle to prevent overturning from at least two different strategies as a function of at least one of the steps of determining and making; and
    (c) performing at least one intervention for stabilizing the vehicle based on a selected one of the at least two different strategies, wherein one of the at least one intervention for one of the at least two different strategies is different than another of the at least one intervention for another of the at least two different strategies.

2. The method of claim 1, further comprising the step of performing another comparison as a function of the quantity corresponding to the lateral dynamics of the vehicle and of the characteristic value; wherein the step of selecting a strategy includes the step of determining as a function of the another comparison whether to select one of the at least two strategies.

3. The method of claim 2, wherein:
    the step of performing the another comparison includes the steps of:
        determining a difference using the characteristic value and a magnitude of the quantity corresponding to the lateral dynamics of the vehicle; and
        comparing the difference to a predefinable threshold value; and
    the step of selecting a strategy is performed based on the step of comparing by selecting no strategy if the difference is greater than the predefinable threshold value, and by selecting one of the at least two strategies if the difference is not greater than the predefinable threshold value.

4. The method of claim 1, wherein a first strategy of the at least two strategies includes the step of performing at least one of an engine intervention and a brake intervention at at least one wheel having a large wheel load so that the at least one wheel is braked heavily.

5. The method of claim 1, further comprising the steps of:
performing at least one of the steps of:
- making another comparison as a function of a difference determined from the characteristic value and a magnitude of the quantity corresponding to the lateral dynamics of the vehicle; and
- making still another comparison as a function of the quantity corresponding to the lateral dynamics of the vehicle; and determining whether to perform at least one of a brake intervention and an engine intervention of at least one of a first strategy and a second strategy as a function of at least one of the another comparison and the still another comparison.

6. The method of claim 1, wherein a second strategy of the at least two strategies includes the step of performing at least one of a brake intervention to uniformly brake all wheels of the vehicle and an engine intervention to reduce engine torque.

7. The method of claim 4, wherein:
- the at least one of the brake intervention and the engine intervention is performed so that the quantity corresponding to the lateral dynamics of the vehicle approaches but does not exceed the characteristic value; and
- the at least one of the brake intervention and the engine intervention at least depends on a difference determined using the characteristic value and the quantity corresponding to the lateral dynamics of the vehicle.

8. The method of claim 5, wherein for at least one of the steps of making the third comparison and making the fourth comparison:
- the step of making the another comparison includes at least one of the steps of:
  - comparing the difference to a first threshold value; and
  - comparing a quantity corresponding to a time-related change of the difference to a second threshold value; and
- the step of making the still another comparison includes the step of comparing a time-related change of the quantity corresponding to the lateral dynamics of the vehicle to a third threshold value; wherein:
  - the at least one of the brake intervention and the engine intervention of the at least one of the first strategy and the second strategy is not performed if the difference is positive and the quantity corresponding to the time-related change of the difference is greater than the second threshold value;
  - the at least one of the brake intervention and the engine intervention of the first strategy is performed if:
    - in the an other comparison, at least one of the following is satisfied: the difference is negative and the quantity corresponding to the time-related change of the difference is not greater than the second threshold value; and
    - in the still another comparison, the time-related change of the quantity corresponding to the lateral dynamics is not greater than the third threshold value; and
  - the at least one of the brake intervention and the engine intervention of the second strategy is performed if:
    - in the another comparison, at least one the following is satisfied: the difference is negative and the quantity corresponding to the time-related change of the difference is not greater than the second threshold value; and
    - in the still another comparison, the quantity corresponding to the time-related change of the lateral dynamics is greater than the third threshold value.

9. The method of claim 1, wherein the characteristic value is determined at least as a function of a quantity corresponding to instantaneous friction conditions associated with a driving situation.

10. The method of claim 1, wherein the step of making the comparison includes the step of determining a difference using the characteristic value and a magnitude of the quantity corresponding to the lateral dynamics of the vehicle, a first strategy being selected if the difference is negative and a second strategy being selected if the difference is not negative.

11. The method of claim 10, further comprising the step of:
making another comparison as a function of a quantity corresponding to a timerelated change of the difference; wherein:
- the at least one of the brake intervention and the engine intervention of the second strategy is performed if the quantity corresponding to the time-related change of the difference is greater than a corresponding threshold value; and
- the at least one of the brake intervention and the engine intervention of the first strategy is performed if the quantity corresponding to the time-related change is not greater than the corresponding threshold value.

12. The method of claim 1, wherein the step of determining if an overturn tendency exists includes the steps of:
- determining an overturn quantity at least as a function of a quantity corresponding to a wheel behavior of at least one wheel; and
- determining if the overturn tendency exists based on the overturn quantity.

13. The method of claim 10, wherein:
- the step of determining if the overturn tendency exists includes the step of determining an overturn quantity at least as a function of a quantity corresponding to a wheel behavior of at least one wheel; and
- in the step of selecting, the first strategy is selected if the overturn tendency exists and the second strategy is selected if the overturn tendency does not exist, the at least one intervention of the first strategy including at least one of a brake intervention and an engine intervention.

14. The method of claim 12, wherein:
- the quantity corresponding to the wheel behavior at least depends on a wheel load associated with a specific wheel; and
- the quantity corresponding to the wheel behavior corresponds to at least one of a wheel slip, a quantity corresponding to a wheel speed, a quantity corresponding to one of a wheel deceleration and a wheel acceleration, and an indication of an intervention by a slip controller to stabilize at least one wheel.

15. The method of claim 14, wherein:
at least one of a brake intervention and an engine intervention is performed at at least one wheel for a short time at least as a function of the quantity corresponding to the lateral dynamics of the vehicle; and at least one of the quantity corresponding to the wheel behavior and a quantity corresponding to the indication of the intervention by the slip controller is determined for at least one of:

while at least one of a braking torque and a drive torque is at least one of generated and changed at the at least one wheel for the short time; and subsequent to the at least one of the braking torque and the drive torque being at least one of generated and changed at the at least one wheel for the short time.

16. The method of claim 15, further comprising the step of determining a resulting change in the quantity corresponding to the wheel behavior; wherein the overturn tendency exists for at least one of a magnitude of the resulting change being greater than a corresponding threshold value and the quantity corresponding to the indication of the intervention by the slip controller.

17. The method of claim 13, wherein:

the step of determining the quantity corresponding to the wheel behavior of the specific wheel includes the step of determining a quantity corresponding to one of a diameter and a radius of the specific wheel, at least as a function of a quantity corresponding to at least one of the wheel speed of the specific wheel, a quantity corresponding to a vehicle speed, the quantity corresponding to the lateral dynamics of the vehicle, and a quantity corresponding to a geometry of the vehicle; and the overturn tendency of the vehicle exists if the quantity corresponding to the ore of the diameter and the radius is greater than a corresponding threshold value.

18. A device for stabilizing a vehicle, the stabilizing including preventing the vehicle from overturning about a vehicle axis oriented in a longitudinal direction of the vehicle, the device comprising:

an arrangement for performing at least one of determining if an overturn tendency exists for the vehicle and making a first comparison as a function of a quantity corresponding to lateral dynamics of the vehicle and of a characteristic value for the quantity corresponding to the lateral dynamics of the vehicle;

an arrangement for selecting a strategy for stabilizing the vehicle to prevent overturning from at least two different strategies as a function of a result provided by the arrangement for performing the at least one of determining if the overturn tendency exists and making the first comparison; and an arrangement for performing at least one intervention for stabilizing the vehicle based on a selected one of the at least two different strategies.

19. The method of claim 14, wherein the slip controller is a wheel-slip controller.

20. The method of claim 15, wherein the slip controller is a wheel-slip controller.

\* \* \* \* \*

UNITED STATES PATENT AND TRADEMARK OFFICE
CERTIFICATE OF CORRECTION

PATENT NO.   : 6,349,247 B1
DATED        : February 19, 2002
INVENTOR(S)  : Schramm H. et al.

It is certified that error appears in the above-identified patent and that said Letters Patent is hereby corrected as shown below:

Column 2,
Line 14, change "used for different" to -- used for different vehicles --.

Column 12,
Line 13, change "form" to -- forms --

Column 13,
Line 53, change "an other" to -- another --

Signed and Sealed this

Sixth Day of May, 2003

JAMES E. ROGAN
*Director of the United States Patent and Trademark Office*